United States Patent
Erhage et al.

(10) Patent No.: US 6,643,500 B1
(45) Date of Patent: *Nov. 4, 2003

(54) METHOD AND ARRANGEMENT FOR RADIOCOMMUNICATIONS

(75) Inventors: Lars Erhage, Mölndal (SE); Per-Arne Kindberg, Mölnlycke (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,297

(22) Filed: Nov. 19, 1999

(30) Foreign Application Priority Data

Nov. 20, 1998 (SE) ................ 9803991

(51) Int. Cl.⁷ .................. H04B 1/06
(52) U.S. Cl. .......... 455/276.1; 455/304; 455/63; 455/139
(58) Field of Search .............. 455/295, 311, 455/296, 293, 304, 303, 310, 276.1, 137, 139, 273, 63; 342/372, 157; 330/144, 155

(56) References Cited

U.S. PATENT DOCUMENTS

| | | | |
|---|---|---|---|
| 5,216,425 A | | 6/1993 | Erhage |
| 5,334,946 A | * | 8/1994 | Kenington et al. ......... 330/144 |
| 5,454,066 A | | 9/1995 | Tsai |
| 5,528,196 A | * | 6/1996 | Baskin et al. ............. 330/151 |
| 5,596,323 A | * | 1/1997 | Erhage et al. ............. 341/155 |
| 5,933,112 A | * | 8/1999 | Hiramatsu et al. ......... 342/372 |

FOREIGN PATENT DOCUMENTS

| | | |
|---|---|---|
| EP | 0 545 742 | 6/1993 |
| SE | 468 029 | 8/1992 |

* cited by examiner

*Primary Examiner*—Nay Maung
*Assistant Examiner*—John J Lee

(57) ABSTRACT

Distortion is reduced in a radiocommunications system in which a radio signal is received with a carrier frequency with a group antenna. The group antenna includes at least two receiver channels with an antenna element and components for amplifying and processing the respective signal. A first phase shift by a predetermined value is performed directly after reception of the signal in the respective channel. A second phase shift by a value is performed which corresponds to the first phase shift but in the opposite direction. In this manner, distortion which arises as a result of, for example, non-linearities in an antenna array, is reduced.

6 Claims, 1 Drawing Sheet

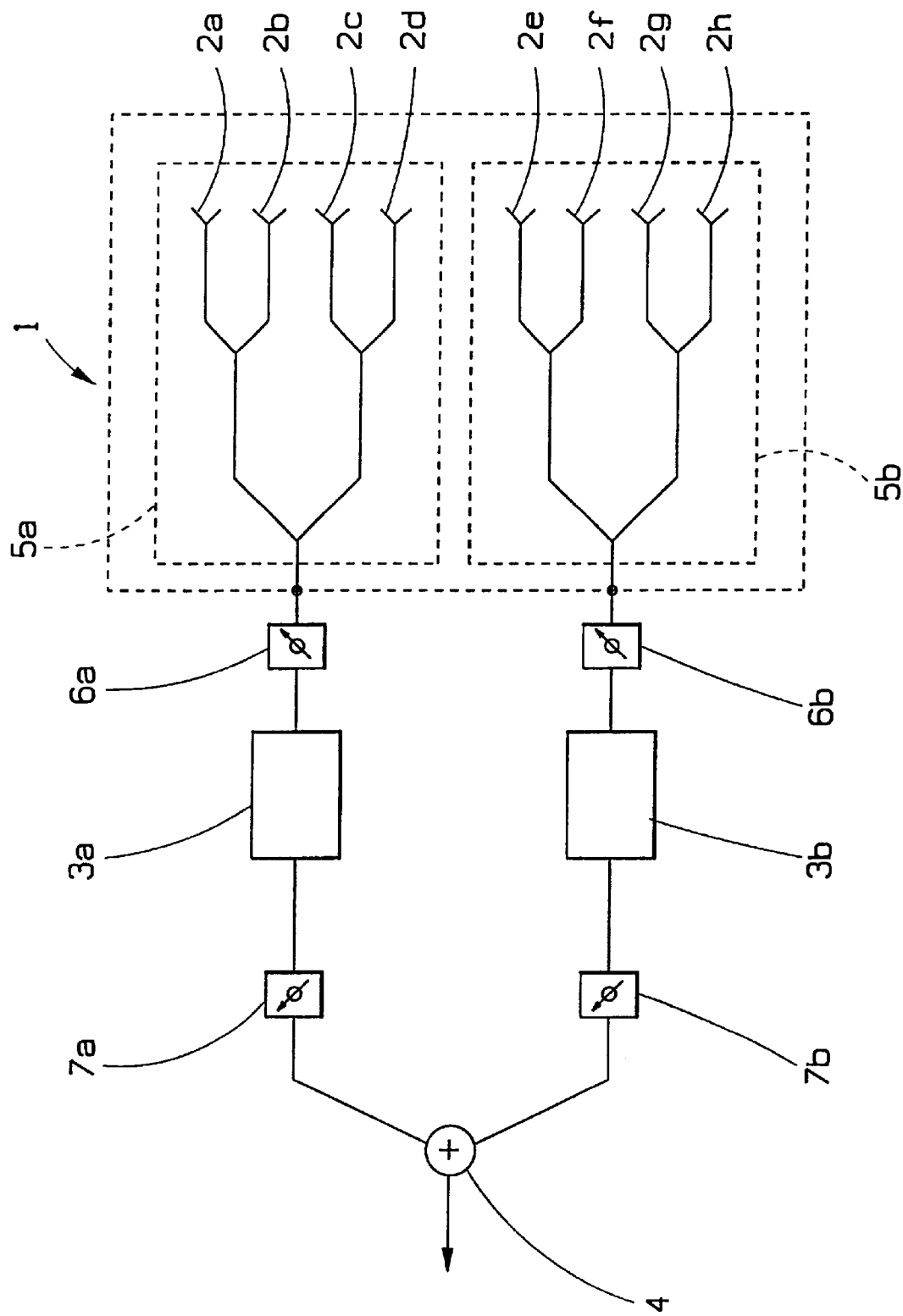

METHOD AND ARRANGEMENT FOR RADIOCOMMUNICATIONS

This application claims priority under 35 U.S.C. §§119 and/or 365 to 9803991-0 filed in Sweden on Nov. 20, 1998; the entire content of which is hereby incorporated by reference.

FIELD

The present invention concerns a method and an arrangement for radiocommunications. The invention is designed in particular to be used for radio receivers, for example radar systems, for reducing distortion in these types of receiver.

BACKGROUND

In connection with radiocommunications, a type of radio receiver often used is that erected around a an antenna array for receiving and handling radio signals. This type of antenna is normally used, for example, with radar systems. Based on established technology, such an antenna array consists of a number of antenna elements which are connected to a corresponding number of amplifiers. The received and amplified signals are then fed through electrical circuits, normally in the form of mixers, filters and A/D converters. In this way the antenna can be said to be formed of a number of receiver channels, each of which is connected to one or more antenna elements with their associated electrical circuits, whereby the output signals from the respective channels are suitably processed and handled in digital signal-processing circuits.

One problem that can arise in connection with previously known radio receivers which are based on antenna arrays concerns the fact that the various receiver channels have non-linearities and other imperfections, for example, timing errors, gain errors and phase errors, which in different ways give rise to undesirable distortion. For instance, the distortion can lead to intermodulation products between adjacent frequencies, insufficient suppression of mirror components and the generation of undesirable harmonies in the received radio signals. These imperfections will of course constitute problems in radiocommunications systems.

Based on established technology, the aforementioned problem of distortion in the form of non-linearities can be solved to a certain extent by filtering the received signals, e.g. by using bandpass filters which are placed downstream the respective amplifier in the respective receiver channel. In this way, for example, the intermodulation products which lie outside the transmitted signal band in question can be attenuated. Such filters are however limited in that they do not provide continuous suppression of undesirable signals. The result of this is that signals lying outside the frequency band in question will to a certain extent leak through and have a negative effect on the desirable received signals. In an A/D converter, for example, these undesirable signal components, when mixed down to baseband, are diverted into the frequency range which is used for subsequent handling of the received signals.

Another solution to the abovementioned problem is to use an active antenna which includes amplifiers with a very high degree of linearity. A disadvantage of this solution is, however, that it demands a relatively high power consumption from the amplifiers in question, which in turn results in amplifiers with relatively high running costs. However, this will not in itself solve the problem of mirror frequencies which can give rise to distortion after mixing down to baseband.

The problems connected with distortion in antenna arrays can be illustrated by the following. In the case of a receiver system which consists of quantity M antenna elements and receiver channels, the following applies. During spatial beam-formation, which can be either analogue or digital, the signals from the respective channels are added, whereby the signals can be weighted according to the following equation:

$$z(t) = \sum_{m=1}^{M} W_m \cdot X_m(t)$$

where $X_m(t)$ is made up of the signal in the mth channel at time t, which includes the desired received signal as well as distortion. The weighted values $W_m$ are complex and are chosen based on the properties which are required in the resultant signal z(t), for example formation of sidelobes and the antenna's desired sensitivity in a certain direction. Even if the distortion in itself is small, it can, after summation according to the equation above, reach energy levels which exceed the threshold which is set in a radar system when a target is detected. In this way, for example, a false target can be detected by a radar system using this technology, which will of course constitute a problem.

In patent document EP 0545742, an arrangement is shown for reducing overtones generated by non-linearities in the amplifiers of an active antenna. In this arrangement, antenna elements with their associated amplifiers are split into at least two groups. A common phase shift $\phi$ is added to each of the amplifier groups. In one of the two groups, the phase shift is added to the signal before the respective amplifier, and in the second group the phase shift is added after the respective amplifier. In this way, a reduction in the level of the overtones is achieved.

Patent document SE 468029 describes a method for reducing the effect of distortion in a signal-processing system for analogue-digital conversion of samples of an electrical signal. According to this method two quadrature signals are formed before the conversion, whereby these signals are phase-modulated before conversion and phase-demodulated after conversion. In this way the fundamental frequency in the signal will be correctly demodulated while any harmonies and intermodulation products will have residual phase modulation after the phase demodulation.

In the process, the undesirable signal components can be suppressed by means of filtering.

SUMMARY

The object of the present invention is to offer an improved method for radiocommunications, in particular for reducing the distortion which occurs in an antenna array with several receiver channels. This object is achieved by means of a method and an arrangement.

The invention is designed for reducing distortion in a radiocommunications system which includes reception of a radio signal at a carrier frequency with an antenna array which includes at least two receiver channels with an antenna element and components for amplifying and processing respective signals. According to the invention, the received signal in the respective receiver channel is also amplified. According to the invention there will additionally occur a first phase shift of a predetermined value also takes place directly after reception of the said signal in the respective channel, and a second phase shift with a value which corresponds to the said first phase, shift, but in the opposite direction.

According to the invention, the real carrier-frequency signals in the respective receiver channel are given a phase shift βm, where m=1, ..., M, which is referred to below as "spatial phase coding". After the formation of complex signals, the phase is shifted back in the respective receiver channel, chiefly by means of complex multiplication by exp(−jβm).

Because of the method according to the invention, only those frequency components which are originally in the desired frequency band around $\omega_o$ will be completely restored. Other frequency components will have varying "residual" valves (i.e. a residual phase shift) remaining from the phase shift added initially. Because of this residue it will be possible to reduce the distortion when adding the channels in the receiver in question.

The choice of the phase shift βm can be varied depending on the requirements, and will be clarified when reference is made to the embodiments of the invention below.

DESCRIPTION OF THE FIGURE

The invention will be described in detail below with reference to the attached FIGURE, which shows the principle of a radiocommunications system in which the present invention can be used.

DETAILED DESCRIPTION

The present invention is intended to be used in a system for radiocommunication, for example in connection with a radar system. In accordance with a preferred embodiment, which is shown in the attached FIGURE, the invention is used with a radio receiver of the type which is installed around an antenna array 1, which is a type of antenna known per se. The antenna array 1 is itself formed by a predetermined number of antenna elements 2a, 2b, 2c, 2d, 2e, 2f, 2g, 2h, each of which is connected to a receiver 3a, 3b. The receivers 3a, 3b are designed for amplifying and processing the radio signals received from antenna elements 2a–2h. This type of reception and processing of radio signals, for example in a radar system, is already well established and is not described in detail here. The output signals from respective receivers 3a, 3b are fed to and added at a summation point 4. The signals thus added are subsequently processed by a signal-processing system (not shown), which would preferably be digital.

Although only eight antenna elements 2a–2h are shown in the FIGURE, the invention is not limited to antennas with this number of antenna elements. It can be noted that antenna arrays normally include a considerably greater number of antenna elements. Furthermore, according to the embodiment, the antenna elements 2a–2h are divided into two part antennas 5a, 5b each of which comprises a group of four antenna elements. The invention is however not limited to this configuration, but can, for example, include a different number of part antennas.

It is assumed below that the invention can be realized in connection with a radio receiver station which includes a number M receiver channels each of which consists of one or several antenna elements 2 and a receiver, which in its turn includes suitable signal-processing circuits. It is here assumed, inter alia, that a certain amount of filtering for suppression of undesirable signals in the respective receiver channel is carried out for the most part uniformly in each channel.

The invention is based on the basic principle that a predetermined phase shift βm is added to the signals which are received with a predetermined carrier frequency ωo in the respective receiver channel m (where m=1, ..., M) before the signal reaches the respective receiver 3a, 3b. To this end, the respective receiver channel includes an arrangement 6a, 6b for phase-shifting an incoming signal. These phase shifters 6a, 6b are preferably located between the respective part antenna 5a, 5b and the respective receiver 3a, 3b. This implies therefore that a phase shift βm is added to the respective signal before it is fed to the amplifier which forms part of respective receiver 3a, 3b. This phase shift is referred to here as "spatial phase coding".

The invention can also be used in those types of phase-controlled antennas where the respective antenna element includes an integrated module which is adapted for phase-shifting an incoming signal. In this case, a phase shift, according to the invention, is effected in the form of an addition to the nominal phase shift which is produced by a type of phase shifter already present in the respective part antenna, whereby the nominal phase shift is provided, for example, in order to control the antenna electrically so that a specific sensitivity is obtained in a predetermined direction. The invention can also be used in connection with those antennas which are provided with separate, yet already existing, phase shifters in the respective part antenna, whereby a corresponding addition is superimposed on a nominal phase shift.

In order to describe the operation of the invention, it is assumed that the input signal to the receiver in question can generally be represented by the following equation:

$$v_m(t) = a(t)\cos[\omega o^t + \phi(t) + \theta_o + \theta_u + \beta_m]$$

$$= (1/2)[u(t)e^{j(\omega_o t + \gamma_m + \beta_m)} + u*(t)e^{-j(\omega_o t + \gamma_m + \beta_m)}]$$

where a(t) is real amplitude modulation and φ(t) is phase modulation. In addition, ωo=2πf0, whereby $f_0$ consists of the carrier frequency in question of the received signal, $\theta_o$ is the unknown absolute phase angle of the received signal (which also is common to all receiver channels), $\theta_o$ is a further phase shift in channel m relative to a reference channel, and βm is the phase shift in channel m which is added according to the invention. The term u*(t) is a conjugate complex term.

The following equations also apply:

$$u(t)=I(t)+jQ(t)$$

$$I(t)=a(t)\cos[\phi(t)]$$

$$Q(t)=a(t)\sin[\phi(t)]$$

$$\gamma_m=\theta_0+\theta_m$$

After the abovementioned spatial phase coding has been carried out, a conversion to complex signals is carried out and down-mixing to baseband. Subsequently, according to the invention, a complex multiplication by $e^{-j\beta_m}$ is carried out for the signals in the respective channel m. In practice this is achieved according to the invention by providing the respective receiver channel with a second arrangement 7a, 7b for phase-shifting of respective output signals from the respective receivers 3a, 3b. This second phase shifter 7a, 7b will then be located preferably directly after the respective receiver 3a, 3b, but before the summation point 4.

In order to describe the function of the invention, it can be assumed that the input signal $v_m(t)$, according to the above description, will be affected by non-linearities, for example in the receive channels' amplifier, whereby these non-linearities can be modelled by means of a polynomial according to:

$$y(t) = f(x(t)) = \sum_{k=0}^{\infty} b_k \cdot x(t)^k = b_0 + b_1 \cdot x(t) + b_2 \cdot x(t)^2 + \ldots$$

$$v_m(t) = a(t)\cos[\omega_0 t + \phi(t) + \gamma_m + \beta_m] + a(t)\cos[(\omega_o + \Delta_\omega)t + \phi(t) + \gamma_m + \beta_m] =$$

$$= (1/2)\left[u(t)e^{j(\omega^{(m)} + \gamma_m + \beta_m)} + u*(t)e^{-j(m\omega t + \gamma_m + \beta_m)}\right] +$$

$$+ (1/2)[u(t)e^{j(\omega_o + \Delta_o)} + u*(t)e^{-jl(\omega_o + \Delta_o)t + \gamma_m + \beta_m)}]$$

With the model that was used in the non-linearity case, according to the above polynomial y(t), the following equation is obtained for the input signal $v_m(t)$:

$$y(t) = [b_1 + (b_2/2)|u(t)|^2[2 + e^{j\Delta\omega t} + e^{-j\Delta\omega t}] + (1/2)[b_1(1+e^{j\Delta\omega t}) + (3b_3/4)|u(t)|^2(3 + 3e^{j\Delta\omega t} + e^{-j\Delta\omega t} + e^{j2\Delta\omega t})]u(t)e^{j(\omega\tau + \gamma_m + \beta_m)}] +$$

$$(1/2)[b_1(1 + e^{-j\Delta\omega t}) + (3b_3/4)|u(t)|^2(3 + 3e^{-j\Delta\omega t} + e^{-j\Delta\omega t} + + e^{-j2\Delta\omega t})]u*(t)e^{-j(\omega ct + \gamma_m + \beta_m)} + + (b_1/4)[1 + 2e^{j\Delta\omega t} + e^{j2\Delta\omega t}]$$

$$u^*(t)e^{j2(\omega ct + \gamma_m + \beta_m)} + + (b_2/4)[1 + 2e^{-j\Delta\omega t} + e^{-j2\Delta\omega t}]u^{*2}(t)e^{-j2(\omega ct + \gamma_m + \beta_m)} + + (b_2/8)[1 + 3e^{j\Delta\omega t} + 3e^{j3\Delta\omega t}]u^*(t)e^{-j3(\omega ct + \gamma_m + \beta_m)}) +$$

$$(b_2/8)[1 + 3e^{-j\Delta\omega t} + 3e^{-j3\Delta\omega t}]u^{*2}(t)e^{-j3(\omega ct + \gamma_m + \beta_m)})$$

where $b_0$ is a DC component and $b_1$ is the desired linear component, whilst $b_2$ and the other components $b_3$ etc. give rise to undesirable overtones. For the abovementioned input signal $v_m(t)$, which thus has been subjected to a phase shift $\beta m$, the following equations are obtained (assuming that the first four terms according to the signal y(t), i.e. $b_0$ to $b_3$, are included.

$$y(t) = b_0 + (b_2/2)|u(t)|^2 + +$$

$$(1/2)[b_1 + (3b_3/4)|u(t)|^2][u(t)e^{j(\omega\tau + \gamma_m + \beta_m)} + u*(t)e^{-j(\omega\tau + \gamma_m + \beta_m)} +$$

$$(b_2/4)[u^2(t)e^{j2(\omega\tau + \gamma_m + \beta_m)} + u^{*2}(t)e^{-j2(\omega\tau + \gamma_m + \beta_m)}] +$$

$$(b_3/8)[u^3(t)e^{j3(\omega\tau + \gamma_m + \beta_m)} + u^{*3}(t)e^{-j3(\omega\tau + \gamma_m + \beta_m)}]$$

After the formation of the complex signal, the signals' phase is thus shifted back in the respective receiver channel by means of the respective second phase shifter 7a, 7b. In accordance with the invention this is carried out, according to the principles described above, by complex multiplication by $e^{-j\beta m}$. Following this multiplication, the following equation is obtained:

$$y_1(t) = b_0 + (b_2/2)|u(t)|^2 e^{-j\beta\omega} + +$$

$$(1/2)[b_1 + (3b_3/4)|u(t)|^2][u(t)e^{j(\omega\tau + \gamma_m)} + u*(t)e^{-j(\omega\tau + \gamma_m + 2\beta m)}] +$$

$$(b_2/4)[u^2(t)e^{j2(\omega\tau + \gamma_m + \beta m/2)} + u^{*2}(t)e^{-j2(\omega\tau + \gamma_m + 3\beta m/2)}] +$$

$$(b_3/8)[u^3(t)e^{j3(\omega\tau + \gamma_m + 2\beta m/3)} + u^{*3}(t)e^{-j3(\omega\tau + \gamma_m + 1\beta m/3)}]$$

where $b_1 u(t)e^{j(\omega 0 t + \gamma m)}$ is the desired signal, which has thus been obtained according to the method in the invention. The remaining terms consist of distortion. It can be noted here that all terms of the type $e^{j\alpha\beta m}$ can be controlled for limitation of undesirable distortion.

The present invention can also be used to control undesirable intermodulation distortion, i.e. undesirable signal components which arise as a result of intermodulation between adjacent frequencies. To describe how the invention can be used, it is assumed in the following discussion that two similar input signals at frequencies $\omega_o$ and $\omega_o + \Delta_\omega$ arrive at the receiver in question. This means that the input signal can be represented as follows:

After complex multiplication by the term em=−jβmin accordance with the above description, the following is obtained:

$$y_1(t) = [b_0 + (b_2/2)|u(t)|^2(2 + e^{j\Delta\omega t} + e^{-j\Delta\omega t})]e^{-j\beta m} + +$$

$$(1/2)[b_1(1 + e^{j\Delta\omega t}) +$$

$$(3b_3/4)|u(t)|^2(3 + 3e^{j\Delta\omega t} + + e^{-j\Delta\omega t} + e^{j2\Delta\omega t})]u(t)e^{j(\omega t + \gamma m)} + +$$

$$(1/2)[b_1(1 + e^{-j\Delta\omega t}) +$$

$$(3b_3/4)|u(t)|^2(3 + e^{j\Delta\omega t} + + 3e^{-j\Delta\omega t} + e^{-j2\Delta\omega t})]u* $$

$$(t)e^{-j(\omega t + \gamma m)} + +$$

$$(b_2/4)[1 + 2e^{j\Delta\omega t} + e^{j2\Delta\omega t}]u^*(t)e^{j2(\omega t + \gamma m + \beta m/2)} + +$$

$$(b_2/4)[1 + 2e^{-j\Delta\omega t} + e^{-j2\Delta\omega t}]$$

$$u^{*2}(t)e^{-j2(\omega t + \gamma m + 3\beta m/2)} +$$

$$(b_3/8)[1 + 3e^{j\Delta\omega t} + 3e^{j2\Delta\omega t} + e^{j3\Delta\omega t}]u^3(t)e^{j3(\omega t + \gamma m + 2\beta m/3)} + +$$

$$(b_3/8)[1 + 3e^{-j\Delta\omega t} + 3e^{-j2\Delta\omega t} + e^{-j3\Delta\omega t}]u^{*3}(t)e^{-j3(\omega t + \gamma m + 4\beta m/3)}$$

where the term $u(t)(1 + e^{j\Delta\omega t})e^{j\omega 0 t + \gamma m}$ is the desired signal. The remaining terms are distortion.

The above description shows how the invention can be used in principle to reduce the distortion caused by non-linearities and other imperfections, e.g. undesirable intermodulation products. Examples are given below of how selected parts of the distorting signals can be reduced via the abovementioned spatial phase coding, i.e. the phase shift βm.

Further explanations of the invention are given below with reference to an example of the reduction of a certain type of undesirable distortion in the form of a linear mirror signal. The same technique as that explained below can also be used for reducing other types of distortion, e.g. DC components, first overtone, second overtone, intermodulation products, etc.

For the reduction of linear mirror components, the invention can be used in two different ways, namely cancellation and "spreading". For the m'th channel, according to the above explanation, it follows that the linear mirror component has been phase shifted $-2\beta_m$. If the real signal has been phase shifted by βm, in which case the frequency component $\exp(j_{\omega 0}t)$ will be phase-shifted by $\beta m$, whilst its mirror, $\exp(-j_{\omega 0}t)$, is shifted by $-\beta m$. Multiplication by $\exp(-\beta m)$ then means that both these components are phase shifted by $-\beta m$. An initial phase shift will thus be restored for the desired signal, whilst the linear mirror component will still be shifted, but now by $-2\beta m$.

Concerning the cancellation method, it can be noted that since the phase relation $\theta_m$ between different channels is known, the extra phase shift $\beta m$ in the respective channel can be chosen so that the signals deriving from the linear mirror component added channel each other out, i.e.

$$\sum_{m=1}^{M} e^{-j(\theta_m + 2\beta m)} \approx 0$$

In the case where only two channels (m and n) are used, this means that:

$$\beta_m = (2k+1)(\pi/2) + \beta_n + (\theta_n - \theta_m)/2$$

where k is an integer.

Concerning the "spreading" method, it is also possible to prevent coherent integration of the linear mirror signal by choosing $\beta m$ at random, for example by selection from a uniform distribution within the range $[-\pi, \pi]$. Assuming that the phase relation between the channels is systematic, this method will spread the linear mirror's phases in the channels over the whole angle range $[-\pi, \pi]$ whereby the signals are added non-coherently. By using a "random choice" (i.e. by choosing $\beta m$ to give a "random" distribution or spread of the undesirable components), all distortion components in the form of linear mirror components can thus be reduced.

For simultaneous reduction of most of the distortion components which arise from non-linearities, the "spreading" principle could be preferable, since it is effective on most of the distorting components, i.e. those components which include the factor $\beta m$.

According to the invention, a predetermined phase shift $\beta m$ is thus added to the signals which are received at a certain carrier frequency $\theta_0$ in channel m (where m=1, ..., M) before distortion arises during amplification. After that the phase of the signal in channel m is shifted back to basically the same value. Only those non-distorted signal components at the carrier frequency in channel m will be fully phase-compensated as a result of this shift. In accordance with the invention, a reduction is then obtained of the total distortion of the added signals from the various channels.

In order to ensure effective reduction of distortion, the spatial phase coding can be changed at specific intervals. In this way there will be no risk of the spatial phase angles being unfortunately chosen so that certain distortion is amplified instead of being reduced.

The invention is not limited to the exemplary embodiments described above and shown on the drawings, but can be varied within the scope of the patent claims below. For example, the invention can be used for both active and passive antenna arrays. The invention can also be used for antennas with different numbers of antenna elements. Furthermore the antenna elements can be arranged in a single dimension (i.e. when a number of antenna elements are arranged in line) or in several dimensions (e.g. when the antenna elements are arranged as a two-dimensional matrix).

Furthermore the invention is not limited to use in connection with radar systems, but can be used in other radio-communications systems where antenna arrays are used, e.g. signal-interception systems and mobile telephone systems.

What is claimed is:

1. A method of reducing distortion in a radiocommunication system having a plurality of antenna elements forming an antenna array, and at least two receiver channels associated with respective portions of the array, each of the channels including an amplifier for amplifying received signals, said method comprising the steps of:

receiving a radio signal at a carrier frequency with the antenna array;

supplying the signal received by each portion of the array to each portion's associated receiver channel;

in each receiver channel:
phase-shifting the received signal in a first direction by a predetermined angle prior to the signal reaching the channel's respective amplifier;

amplifying the phase-shifted signal in each channel's respective amplifier; and after amplifying the phase-shifted signal, phase-shifting the amplified signal by the predetermined angle in a second direction that is opposite to the first direction to produce an output signal from each receiver channel; and supplying the output signals from each of the receiver channels to a summation device.

2. The method according to claim 1, wherein the steps of phase-shifting include phase-shifting the signal by a predetermined angle that is chosen so that signals derived from undesirable distortion components in the received signal cancel each other.

3. The method according to claim 1, wherein the steps of phase-shifting include phase-shifting the signal by a predetermined angle that is chosen to give a random spread of undesirable distortion components in the received signal.

4. The method according to claim 1, wherein each respective antenna element is equipped with means for phase-shifting, and the step of phase-shifting the received signal in a first direction is performed in addition to a phase shift performed by the phase-shifting means at the antenna elements.

5. An arrangement for reducing distortion in a radiocommunication system having an antenna array for receiving a radio signal at a carrier frequency, the antenna array including a plurality of antenna elements and at least two receiver channels each containing a receiver for amplifying and processing of received signals, said arrangement comprising:

a first phase-shifter located in each receiver channel between the antenna array and the receiver for phase-shifting by a predetermined angle in a first direction, a respective received signal fed to the receiver channel from the antenna array;

a second phase-shifter located in each receiver channel after the receiver, said second phase-shifter phase-shifting the respective received signal after the signal has been amplified by the receiver, and phase-shifting the signal by the predetermined angle in a second direction that is opposite to the first direction to form an output signal from each receiver channel; and a summation device for adding the output signals from each of the receiver channels.

6. The arrangement according to claim 1, wherein an output of the summation device is connected to a digital signal-processing circuit.

* * * * *